(12) United States Patent
Shet

(10) Patent No.: US 8,315,965 B2
(45) Date of Patent: Nov. 20, 2012

(54) METHOD FOR OBJECT DETECTION

(75) Inventor: Vinay Damodar Shet, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 1247 days.

(21) Appl. No.: 12/107,151

(22) Filed: Apr. 22, 2008

(65) Prior Publication Data

US 2010/0008540 A1 Jan. 14, 2010

(51) Int. Cl.
*G06F 17/00* (2006.01)
*G06N 5/02* (2006.01)
(52) U.S. Cl. ............................................. 706/47
(58) Field of Classification Search .............. 706/47, 706/46, 48, 62
See application file for complete search history.

(56) References Cited

U.S. PATENT DOCUMENTS

2009/0099824 A1* 4/2009 Falash et al. ...................... 703/8

OTHER PUBLICATIONS

Shet, "Bilattice Based Logical Reasoning for Automated Visual Surveillance and Other Applications", Computer Science Theses and Dissertations, UM Theses and Dissertations, Issue Date: Mar. 23, 2007.*

Leibe et al, "Pedestrian Detection in Crowded Scenes", Proceedings of the 2005 IEEE Computer Society Conference on Computer Vision and Pattern Recognition (CVPR 2005).*
Fitting, "Bilattices in Logic Programming", proceedings of the Twentieth International Symposium on Multiple valued logic 1990, Publication Year: 1990, pp. 238-246.*
Sim, "Bilattices and Reasoning in Artificial Intelligence: Concepts and Foundations", Artificial Intelligence Review 15: 219-240, 2001.*
Vinay D Shet, Jan Neumann, Visvanathan Ramesh, Larry S Davis; Bilattice-based Logical Reasoning for Human Detection, IEEE 2007.

* cited by examiner

*Primary Examiner* — Jeffrey A Gaffin
*Assistant Examiner* — Ilya Traktovenko
(74) *Attorney, Agent, or Firm* — Donald B. Paschburg

(57) ABSTRACT

A method for object detection from a visual image of a scene. The method includes: using a first order predicate logic formalism to specify a set of logical rules to encode contextual knowledge regarding the object to be detected; inserting the specified logical rules into a knowledge base; obtaining the visual image of the scene; applying specific object feature detectors to some or all pixels in the visual image of the scene to obtain responses at those locations; using the obtained responses to generate logical facts indicative of whether specific features or parts of the object are present or absent at that location in the visual image; inserting the generated logical facts into the knowledge base; and combining the logical facts with the set of logical rules to whether the object is present or absent at a particular location in the scene.

19 Claims, 8 Drawing Sheets

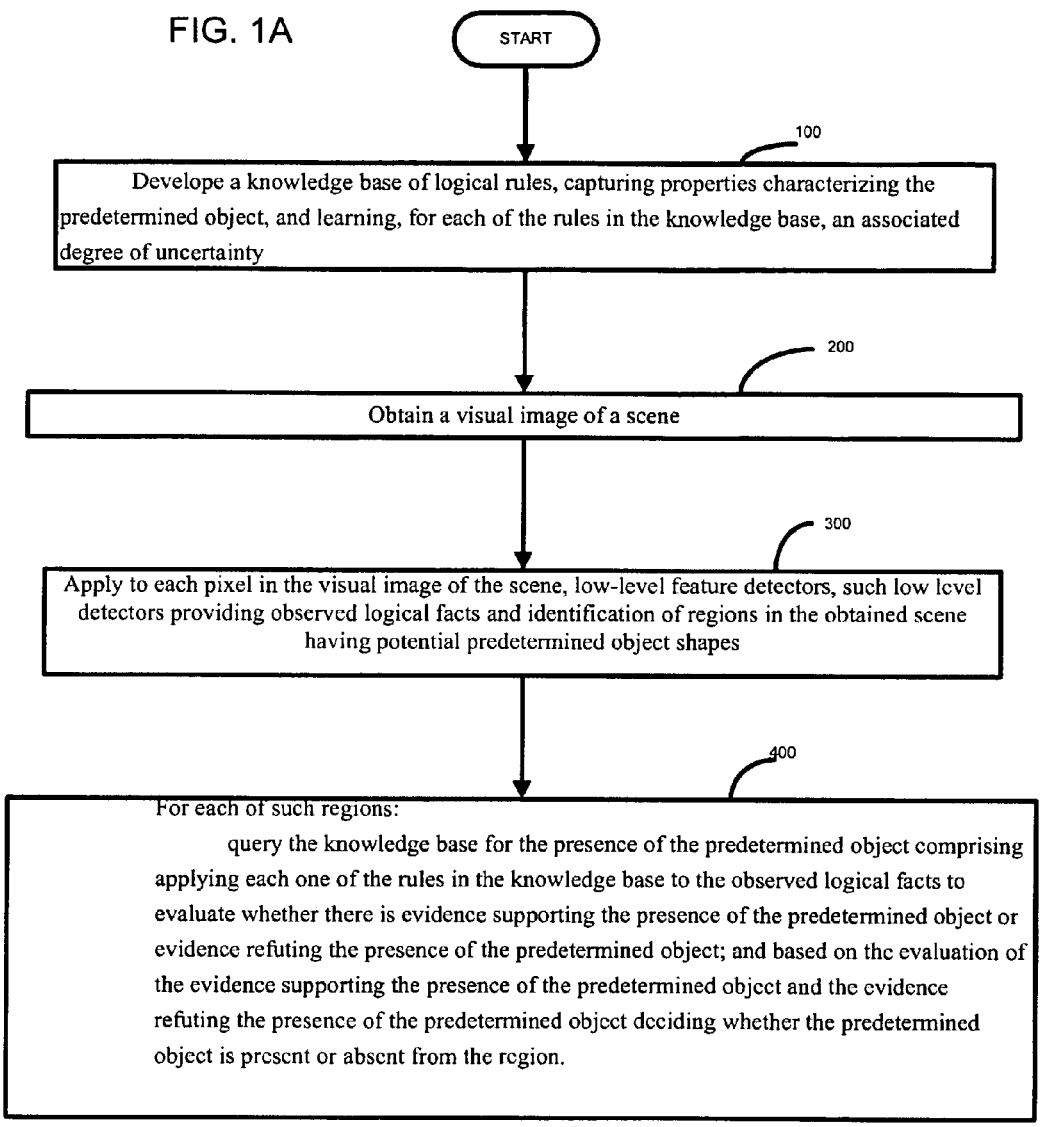

Assume the following set of rules and facts:

| Rules | Facts |
|---|---|
| $\phi(human(X, Y, S)) \leftarrow head(X, Y, S)) = \langle 0.40, 0.60 \rangle$ | $\phi(head(25, 95, 0.9)) = \langle 0.90, 0.10 \rangle$ |
| $\phi(human(X, Y, S)) \leftarrow torso(X, Y, S)) = \langle 0.30, 0.70 \rangle$ | $\phi(torso(25, 95, 0.9)) = \langle 0.70, 0.30 \rangle$ |
| $\phi(\neg human(X, Y, S) \leftarrow \neg scene\_consistent(X, Y, S)) = \langle 0.90, 0.10 \rangle$ | $\phi(\neg scene\_consistent(25, 95, 0.9)) = \langle 0.80, 0.20 \rangle$ |

Inference is performed as follows:

$cl(\phi)(human(25, 95, 0.9)) = \langle 0, 0 \rangle \vee \left[ \langle 0.4, 0.6 \rangle \wedge \langle 0.9, 0.1 \rangle \right] \oplus \langle 0, 0 \rangle \vee \left[ \langle 0.3, 0.7 \rangle \wedge \langle 0.7, 0.3 \rangle \right] \oplus \neg \left( \langle 0, 0 \rangle \vee \left[ \langle 0.9, 0.1 \rangle \wedge \langle 0.8, 0.2 \rangle \right] \right)$ $= \langle 0.36, 0 \rangle \oplus \langle 0.21, 0 \rangle \oplus \neg \langle 0.72, 0 \rangle = \langle 0.4944, 0 \rangle \oplus \langle 0, 0.72 \rangle = \langle 0.4944, 0.72 \rangle$

*FIG. 3*

METHOD FOR OBJECT DETECTION

CROSS-REFERENCE TO RELATED APPLICATIONS

This application is related to U.S. Provisional application No. 60/873,341 filed Dec. 7, 2006, the entire subject matter thereof being incorporated herein by reference.

INCORPORATION BY REFERENCE

This application incorporates by reference the entire subject matter of an article entitled "Bilattice-based Logical Reasoning for Human Detection", by Vinay D. Shet, Jan Neumann, Visvanathan Ramesh and Larry S. Davis, published in the IEEE International Conference on Computer Vision and Pattern Recognition (CVPR), 17-22 Jun. 2007.

TECHNICAL FIELD

This invention relates generally to methods for arbitrary object detection in images and video. The proposed method has been demonstrated to work on the problem of detecting the presence of humans in static images.

BACKGROUND

As is known in the art, the capacity to automatically and robustly detect arbitrary objects in images and video is an important component of automated computer vision systems. Typical objects of interest could be humans, animals, vehicles, packages, airplanes, boats, buildings etc. Recognition of such objects in images and video is an important first step in a number of applications, including but not limited to, automated video/image search, automated visual surveillance, robotics, automated aerial reconnaissance etc. Automatically detecting arbitrary objects of interest in a given image or video sequence however is a difficult problem. This difficulty arises due to wide variability in appearance of the object of interest due to viewpoint changes, illumination conditions, shadows, reflections, camera noise characteristics, object articulation (if any) and object surface properties. The detection problem is further exacerbated if the object of interest is only partially visible either due to occlusion by static scene structures or by occlusions by other objects.

One way to get around the problem of detecting partially visible objects is to design and train several different detectors, that each detect only a certain part of the object. For instance, to detect airplanes, one could design detectors to separately detect airplane wings, fuselage, landing gear and tail. To complete the system, a final step would then be needed to infer the existence of an airplane given the detection of the above-mentioned parts. It is important to note that such a part based object detection strategy would be prone to generating a large amount of false positives. This is primarily due to the fact that it is more likely that there exist structures in the background that resemble a part of the object than the complete object. The final step, a process of going from a set of, possibly erroneous, object part detections to a set of scene consistent, context sensitive, set of object hypotheses is far from trivial.

As is also known in the art, the capacity to robustly detect humans in video is a critical component of automated visual surveillance systems. The primary objective of an automated visual surveillance system is to observe and understand human behavior and report unusual or potentially dangerous activities/events in a timely manner. Realization of this objective requires at its most basic level the capacity to robustly detect humans from input video. Human detection, however, is a difficult problem. This difficulty arises due to wide variability in appearance of clothing, articulation, viewpoint changes, illumination conditions, shadows and reflections, among other factors. While detectors can be trained to handle some of these variations and detect humans individually as a whole, their performance degrades when humans are only partially visible due to occlusion, either by static structures in the scene or by other humans. Human body part based detectors are better suited to handle such situations because they can be used to detect the un-occluded human body parts. However, the process of going from a set of partial human body part detections to a set of scene consistent, context sensitive, human hypotheses is far from trivial.

Since human body part based detectors only learn human body part of the information from the whole human body, they are typically less reliable and tend to generate large numbers of false positives. Occlusions and local image noise characteristics also lead to missed detections. It is therefore important to exploit contextual, scene geometry and human body constraints to weed out false positives, but also be able to explain as many valid missing human body parts as possible to correctly detect occluded humans.

Approaches to detect humans from images/video tend to fall primarily in two categories: those that detect the human as a whole and those that detect humans based on human body part detectors. Among approaches that detect humans as a whole, Leibe et. al [see B. Leibe, E. Seeman, and B. Schiele. Pedestrian detection in crowded scenes. In *IEEE CVPR '05 in San Diego, Calif.*, pages 878-885. sp, May 2005] employs an iterative method combining local and global cues via a probabilistic segmentation. Gavrilla [see D. Gavrila and V. Philomin. Real-time object detection for smart vehicles. In *ICCV99*, pages 87-93, 1999 and D. Gavrila. Pedestrian detection from a moving vehicle. In *ECCV00*, pages II: 37-9, 2000 and D. Gavrila and V. Philomin. Real-time object detection for smart vehicles. In *ICCV99*, pages 87-93, 1999] uses edge templates to recognize full body patterns, Papageorgiou et. al. [see C. Papageorgiou, T. Evgeniou, and T. Poggio. A trainable pedestrian detection system. *Intelligent Vehicles*, pages 241-246, October 1998] uses SVM detectors, and Felzenszwalb [see P. Felzenszwalb. Learning models for object recognition [see In *CVPR01*, pages 1: 1056-1062, 2001] uses shape models. A popular detector used in such systems is a cascade of detectors trained using AdaBoost as proposed by Viola and Jones [see P. Viola and M. Jones. Rapid object detection using a boosted cascade of simple features. IEEE Conference on Computer Vision and Pattern Recognition (CVPR'01), 2001]. Such an approach uses as features several haar wavelets and has been very successfully applied for face detection in [see P. Viola and M. Jones. Rapid object detection using a boosted cascade of simple features. IEEE Conference on Computer Vision and Pattern Recognition (CVPR'01), 2001 and P. Viola, M. Jones, and D. Snow. Detecting pedestrians using patterns of motion and appearance. In *ICCV03*, pages 734-741, 2003.] Viola and Jones [see P. Viola, M. Jones, and D. Snow. Detecting pedestrians using patterns of motion and appearance. In *ICCV03*, pages 734-741, 2003] applied this detector to detect pedestrians and made an observation that Haar wavelets [see Haar wavelet features: see B. Wu and R. Nevatia. Detection of multiple, partially occluded humans in a single image by bayesian combination of edgelet part detectors. *ICCV*, October 2005. Beijing and T. Zhao and R. Nevatia. Bayesian human segmentation in crowded situations. *CVPR*, 2:459-466, 2003, and B. Leibe, E. Seemann, and B. Schiele. Pedestrian detection in crowded scenes. In *IEEE*

CVPR'05 in, San Diego, Calif., pages 878-885. sp, May 2005] are insufficient by themselves as features for human detection and augmented their system with simple motion cues to get better performance. Another feature that is increasing in popularity is the histogram of oriented gradients. It was introduced by Dalal and Triggs [see Dalal and B. Triggs. Histograms of oriented gradients for human detection. In *CVPR05*, pages I: 886-893, 2005] who used a SVM based classifier. This was further extended by Zhu et. al [see Zhu, M. Yeh, K. Cheng, and S. Avidan. Fast human detection using a cascade of histograms of oriented gradients. In *CVPR06*, pages 11: 1491-1498, 2006] to detect whole humans using a cascade of histograms of oriented gradients.

Human body part based representations have also been used to detect humans. Wu and Nevatia [see Wu and R. Nevatia, Detection of multiple, partially occluded humans in a single image by bayesian combination of edgelet human body part detectors. *ICCV*, October 2005. Beijing] use edgelet features and learn nested cascade detectors [see Huang, H. Al, B. Wu, and S. Lao. Boosting nested cascade detector for multi-view face detection. In *ICPR04*, pages II: 415-418, 2004] for each of several body parts and detect the whole human using an iterative probabilistic formulation. Mikolajczyk et al. [see K. Mikolajczyk, C. Schmid, and A. Zisserman. Human detection based on a probabilistic assembly of robust human body part detectors. In *ECCV*, May 2004] divides the human body into seven human body parts and for each human body part a Viola-Jones approach is applied to orientation features. Mohan et. al [see A. Mohan, C. Papageorgiou, and T. Poggio]. Example-based object detection in images by components. *PAMI*, 23(4): 349-361, April 2001] divides the human into four different human body parts and learns SVM detectors using Haar wavelet features [see B. Wu and R. Nevatia. Detection of multiple, partially occluded humans in a single image by bayesian combination of edgelet part detectors. *ICCV*, October 2005. Beijing and T. Zhao and R. Nevatia. Bayesian human segmentation in crowded situations. *CVPR*, 2:459-466, 2003, and B. Leibe, E. Seemann, and B. Schiele. Pedestrian detection in crowded scenes. In *IEEE CVPR'05 in San Diego, Calif.*, pages 878-885. sp, may 2005] follow up low level detections with some form of high level reasoning that allows them to enforce global constraints, weed out false positives, and increase accuracy.

Logical reasoning has been used in visual surveillance applications to recognize the occurrence of different human activities [see V. Shet, D. Harwood, and L. Davis. Vidmap: video monitoring of activity with prolog. In *IEEE AVSS*, pages 224-229, 2005] and, in conjunction with the bilattice framework, to maintain and reason about human identities as well [see V. Shet, D. Harwood, and L. Davis, Multivalued default logic for identity maintenance in visual surveillance, In *ECCV*, pages IV: 119-132, May 2006].

SUMMARY

In accordance with the invention, a method is provided for object detection from a visual image of a scene. The method includes: using a first order predicate logic formalism to specify a set of logical rules to encode contextual knowledge regarding the object to be detected; inserting the specified logical rules into a knowledge base; obtaining the visual image of the scene; applying specific object feature detectors to some or all pixels in the visual image of the scene to obtain responses at those locations; using the obtained responses to generate logical facts indicative of whether specific features or parts of the object are present or absent at that location in the visual image; inserting the generated logical facts into the knowledge base; and combining the logical facts with the set of logical rules to whether the object is present or absent at a particular location in the scene.

In one embodiment, the contextual knowledge is encoded by the logical rules encompasses the responses of the feature detectors, geometric constraints pertinent to the visual image of the scene, interactions between the object and the scene, and interactions between multiple objects.

In one embodiment, the step of specifying logical rules includes specifying positive rules supporting the presence of the object at the particular location in the scene.

In one embodiment, the step of specifying logical rules includes specifying negative rules supporting the absence of the object at the particular location in the scene.

In one embodiment, the step of specifying logical rules includes specifying positive rules supporting the presence of the object at the particular location in the scene as well as specifying negative rules supporting the absence of the object at the particular location in the scene.

In one embodiment, the confidence values are associated with each of the logical rules.

In one embodiment, confidence values are associated with each of the logical facts, such confidence factors being a function of the responses returned by the object feature detectors.

In one embodiment, the confidence values are interpreted within a mathematical formalism.

In one embodiment, the formalism is a Bilattice.

In one embodiment, the confidence values form a tuple comprising positive evidence associated with the presence of the object in the scene and negative evidence associated with the absence of the object from the scene.

In one embodiment, the step of specifying logical rules includes specifying positive rules supporting the presence of the object at the particular location in the scene as well as specifying negative rules supporting the absence of the object at the particular location in the scene, and wherein positive logical rules and associated confidence values are used to derive positive evidence and negative logical rules and associated confidence values are used to derive negative evidence.

In one embodiment, performing the inference comprises computing closure over the knowledge base of logical rules and logical facts along with the associated confidence values.

In one embodiment, the greatest lower bound and least upper bound operators of the mathematical formalism are taken from a family of functions known as the triangular-norms and triangular-conorms respectively.

In one embodiment, the triangular-norm of two terms is defined as their product.

In one embodiment, the triangular-conorm of two terms is defined as their probabilistic sum.

In one embodiment, the confidence values associated with the logical rules are automatically learned from pre-annotated data.

In one embodiment, a proof is generated and displayed as an explanation of the reasons for the method to believe in the existence or nonexistence of the object at the particular location in the visual image of the scene.

In one embodiment, the proof generated is represented as plain English text.

In one embodiment, the proof generated is represented as statements in a logic program.

In one embodiment, the input is a single image of the scene.

In one embodiment, the input is a sequence of images of the scene.

In one embodiment, the object is a human.

In accordance with the invention, a method is provided for detection of a predetermined object from a visual image of a scene. The method includes developing a knowledge base of logical rules, capturing properties that characterize the predetermined object, and learning, for each of the rules in the knowledge base, an associated degree of uncertainty (i.e., a confidence factor). After developing the knowledge base, the method obtains a visual image of a scene and applies to each pixel low-level feature detectors. The output of these detectors serves as observed logical facts. The output of these detectors is also used to identify regions in the obtained scene having potential predetermined object shapes. For each of such regions, a query, to reason about the presence of the predetermined object, is made by applying each one of the rules in the knowledge base to the observed logical facts to evaluate whether there is evidence supporting the presence of the predetermined object (positive evidence) or evidence refuting the presence of the predetermined object (negative evidence). For each one of the regions, based on the evaluation of the positive evidence and negative evidence, the method decides whether the predetermined object is present in any given region or not.

In one embodiment, the knowledge base (KB) development includes: writing a set of rules describing what constitutes the "predetermined object"; learning uncertainties (i.e. confidence measures) for each of the rules specified; interpreting these uncertainties within a mathematical framework known as the bilattice; employing the inference mechanisms provided by the bilattice framework to integrate uncertainties from observed logical facts and pre-specified logical rules, representing both positive evidence as well as negative evidence about the presence of the predetermined object, to arrive at a single answer.

At system setup time, all supporting facts, viz., scene calibration information, any static occlusion zones, ground plane information etc, are inserted into a knowledge base (KB). Having established the KB along with the associated uncertainties, the process captures an image from a camera. Next, low level predetermined object detectors are used to generate response maps. Next, the process generates observed logical facts based on the low level detectors' output. Detection uncertainties reported by the low level detectors are associated with the corresponding observed logical facts and inserted into the KB. Next, the process queries the KB for the presence of predetermined object based on rules and facts. The integration of the uncertainties associated with the rules and the facts representing both positive and negative evidence is performed using the inference mechanism provided by the bilattice framework. Next, the process determines: if for a given hypothesis, "positive evidence" is greater than "negative evidence", then label it as the predetermined object, else label as not the predetermined object.

In accordance with another feature of the invention, a method is for human detection is provided wherein a knowledge base is developed having rules of visual and non-visual characteristics of human shapes and learning for each of the rules in the knowledge base an associated degree of uncertainty. After developing the knowledge base, obtaining a visual image of a scene the method uses low level human body parts based detectors and identifies regions in the obtained scene having potential human shapes. For each region in the obtained scene, the method queries for the presence of a human are made by applying each one of the rules to the knowledge base to evaluate whether there is evidence for a human or evidence against a human in the obtained potential human shapes: and based on the evaluation of the evidence or lack thereof, the method decides whether a human is, or is not in such one of the regions.

In one embodiment, the knowledge base (KB) development includes: writing a set of rules describing what constitutes a "human"; uncertainties (i.e., a confidence factors) for each of the rules specified are learned, and uncertainties taken from an algebraic set are structured as a Bilattice. At system setup time, all supporting facts, viz., scene calibration information, any static occlusion zones, ground plane information etc, are inserted into a knowledge base (KB). Having established the KB and the bilattice, the process captures an image from a camera. Next, low level human detectors are generated in, for example, response maps. Next, the process generates logical facts based on the low level detectors, measures corresponding detection uncertainty and inserts the corresponding detection uncertainty into the KB. Next, the process queries the KB for the presence of human based on rules and facts; combine uncertainties of rules and facts from the KB within the established Bilattice framework using closure operator. Next, the process determines: If for a given hypothesis, "evidence for" is greater than "evidence against", then label it as human, else label as not human.

Thus, in accordance with the invention, a bilattice based logical reasoning approach enables explicitly reasoning about the existence of an object of interest in images/videos by exploiting different sources of information both visual as well as contextual.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A is an overall flowchart of the method according to the invention;

FIG. 3 is Table useful in understanding the invention;

Like reference symbols in the various drawings indicate like elements.

DETAILED DESCRIPTION

1. General Overview

As will be described in more detail below, the method for object detection reasons logically, using logical rules and observed logical facts, about the presence of an object at a particular location in the scene. It does so by aggregating positive as well as negative evidence about the presence of an object at a particular location in the scene, from multiple sources and combining them into a single, final answer.

More particularly, the method provides general object detection in images/videos and is motivated and demonstrated on the problem of human detection in static images. The method takes as input visual data in the form of an image or sequence of frames from a video. It also takes as input, the output of low level detectors (that are trained to detect specific parts of the object to be detected) applied to the input image or frame. The method then requires the specification of logical rules (in a logical programming language such as Prolog) that capture the different properties/aspects of the object to be detected. Loosely, the rules capture the information that an object at a given location within the image is going to have to satisfy. These properties could be visual (such as detections from low level detectors) as well as contextual, examples of which could be mailboxes cannot be located in the middle of the street; humans do not fly and hence have to occur on the ground plane; cars typically have to follow smooth trajectories etc. Such rules could be positive rules or negative rules. Positive rules are rules that reinforce the existence of the object based on a certain property while negative rules are rules that reject the existence of the object based on a certain property. For example, if a query is made to check for the existence of a mailbox in the middle of the street, the negative rule that states that if an object if in the middle of the street, then it is not a mailbox. All these logical rules need to be specified at system setup time.

It is important to note that none of the rules specified as noted above can ever hope to completely characterize the object to be detected. In other words, the individual rules could be erroneous and therefore, confidence measures (henceforth referred to as uncertainties) need to be associated with each rule. The method thus also includes the learning of these uncertainties. The learning sub-method involves examining an operator annotated data set of the object to be detected, and measuring the fraction of the number of times a given rule correctly characterizes the object to the total number of times the rule fires. Once uncertainties associated with each of the rules are learnt, detections from the low level detectors, along with the uncertainty of detection, are combined together with the rules to arrive at a final uncertainty value for whether the object is present at the location in the image or not.

Figure 2:
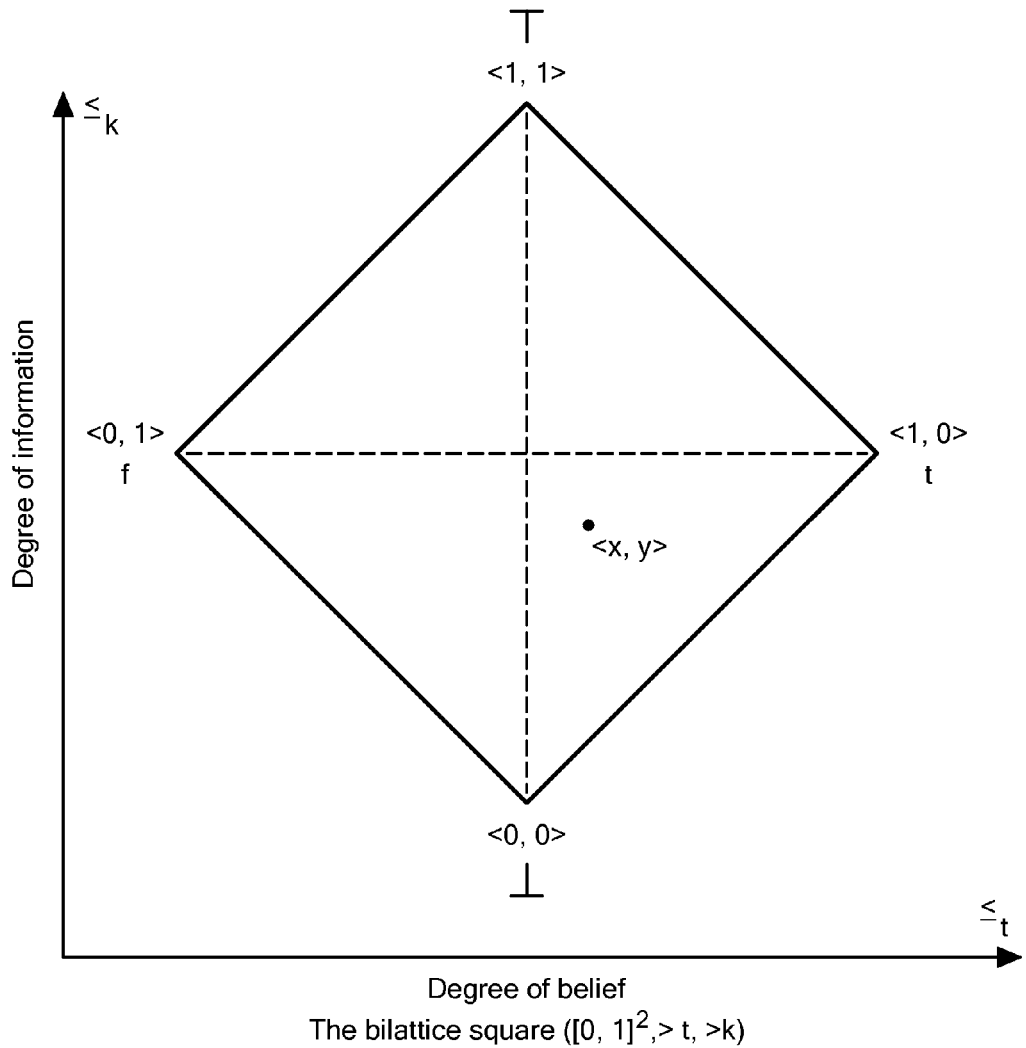
FIG. 2 is a bilattice square used by the method used in the method according to the invention.

The uncertainty values associated with the rules, the low level detections as well as the final conclusion are taken from an algebraic set structured as a Bilattice. The theoretical underpinnings of the Bilattice are outlined in the section titled "Bilattice theory" in this patent. Loosely, every uncertainty value taken from the Bilattice is of the form [degree of positive evidence, degree of negative evidence]. The idea being that if for the final conclusion, the evidence in favor of exceeds the evidence against, then we report that the object is detected in the image, else it is reported that the object is not detected. The degree of positive evidence comes from the positive rules while the degree of negative rules comes from the negative rules. The final uncertainty value is interpreted within the Bilattice as shown in FIG. 2.

Figure 1:
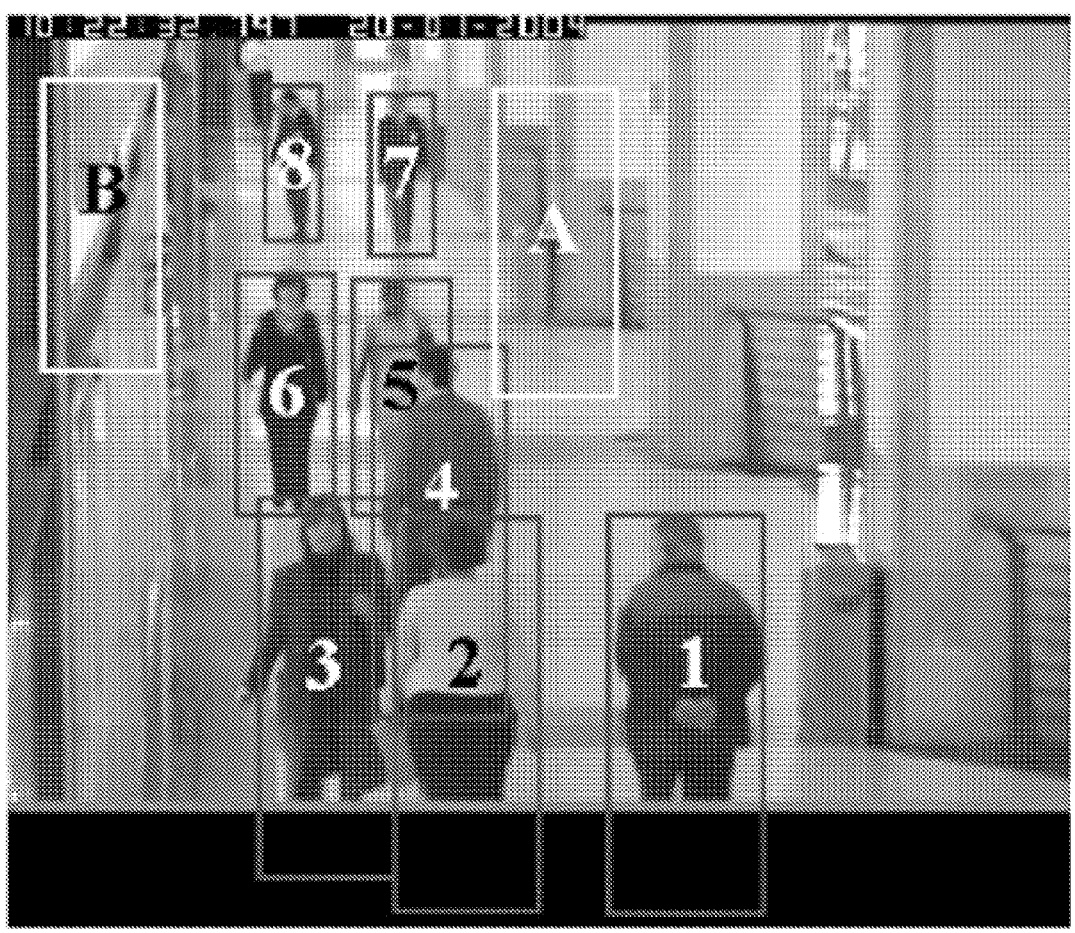
FIG. 1 is a scene obtained by the method according to the invention, such scene having valid human images in regions of such scene as well regions susceptible of having a false positive indication of a human image.

Referring to FIG. 1, a scene is shown wherein a number of humans are occluded by the image boundary as well as by each other. For the problem of detecting human objects in such a scene, the method uses low level feature detectors trained to detect human body parts: for instance, one detector is trained to detect shapes associated with human heads; another to detect shapes associated human torsos; and a third to detect shapes associated with human legs. The output of each of these detectors is treated as observed logical facts. For each of these detectors' output, logical rules are specified that state that a human object is present at a particular location in the scene if that particular detector reports a positive detection in that location. Rules are also specified that state that if a particular detector does not report a positive detection at a particular location, then it refutes the presence of humans at that location.

More complex rules are also specified that capture the effects of interactions of multiple human objects in the scene. For instance, a human object blocking or occluding the full view of another human object may cause, say, its legs to not be visible and thus any detector trained to detect legs might not report a positive detection in that location despite there actually being a human in that location. Thus rules are specified that say that if a particular detector does not report a positive detection, it could still indicate the presence of a human object in that location, as long as the absence of positive detection can be justified (either due to occlusion by another human object or due to occlusion by any static occluding object in the scene). Rules are also specified that take into account different scene geometry constraints. For example, if the size of the human object reported at a particular location by the low level detector is too large for that location, then it would imply that that detection is possibly a false positive and is not a human.

Rules that support the presence of the object are referred to as positive rules while rules that refute presence of the object are referred to as negative rules. Each of the positive and negative rules has a confidence measure (henceforth referred to as uncertainties) associated with them. These uncertainties capture the reliability of the rules and are automatically learnt from pre-annotated data as described in more detail below. In addition to the rules, the detector output (observed logical facts) too has associated uncertainties that capture the degree of confidence of detection. The bilattice framework employed in this method mathematically makes possible principled integration of uncertainties from observed logical facts and logical rules into a single answer.

This integration is in such a form that all positive rules along with the supporting facts form "positive evidence" and all negative rules along with associated logical facts form "negative evidence". Both "positive evidence" and "negative evidence" are numbers between 0 and 1. This pair of uncertainties denoted together by ["positive evidence", "negative evidence"] can be interpreted within the mathematical structure known as a bilattice as shown in FIG. 2. In case that the final "positive evidence" computes to 1 and "negative evidence" computes to 0, the uncertainty value [1,0] indicates presence of the object with 100% confidence. In case where the final uncertainty value is [0,1], it indicates absence of the object with 100% confidence. [0,0] indicates that there is no information either supporting or refuting the presence of the object, while [1,1] indicates contradictory information about the presence of the object. In practice, any final answer where "positive evidence" exceeds "negative evidence" is considered to indicate the presence of the object in the scene.

Thus referring to FIG. 1A, an overall flowchart is shown of the method for detection of a predetermined object from a visual image of a scene in accordance with the invention. The method includes developing a knowledge base of logical rules, capturing properties that characterize the predetermined object, and learning, for each of the rules in the knowledge base, an associated degree of uncertainty (i.e., a confidence factor), Step 100. After developing the knowledge base, the method obtains a visual image of a scene, Step 200 and applies to each pixel low-level feature detectors, Step 300. The output of these detectors serves as observed logical facts. The output of these detectors is also used to identify regions in the obtained scene having potential predetermined object shapes. For each of such regions, a query, to reason about the presence of the predetermined object, is made by applying each one of the rules in the knowledge base to the observed logical facts to evaluate whether there is evidence supporting the presence of the predetermined object (positive evidence) or evidence refuting the presence of the predetermined object (negative evidence). For each one of the regions, based on the evaluation of the positive evidence and negative evidence, the method decides whether the predetermined object is present in any given region or not, Step 400.

Here, in one embodiment, the knowledge base (KB) development includes: writing a set of rules describing what constitutes the "predetermined object"; learning uncertainties (i.e. confidence measures) for each of the rules specified; interpreting these uncertainties within a mathematical framework known as the bilattice; employing the inference mechanisms provided by the bilattice framework to integrate uncertainties from observed logical facts and pre-specified logical rules, representing both positive evidence as well as negative evidence about the presence of the predetermined object, to arrive at a single answer.

At system setup time, all supporting facts, viz., scene calibration information, any static occlusion zones, ground plane information etc. are inserted into a knowledge base (KB). Having established the KB along with the associated uncertainties, the process captures an image from a camera. Next, low level predetermined object detectors are used to generate response maps. Next, the process generates observed logical facts based on the low level detectors output. Detection uncertainties reported by the low level detectors are associated with the corresponding observed logical facts and inserted into the KB. Next, the process queries the KB for the presence of predetermined object based on rules and facts. The integration of the uncertainties associated with the rules and the facts representing both positive and negative evidence is performed using the inference mechanism provided by the bilattice framework. Next, the process determines: if for a given hypothesis, "positive evidence" is greater than "negative evidence", then label it as the predetermined object, else label as not the predetermined object.

Figure 1B:
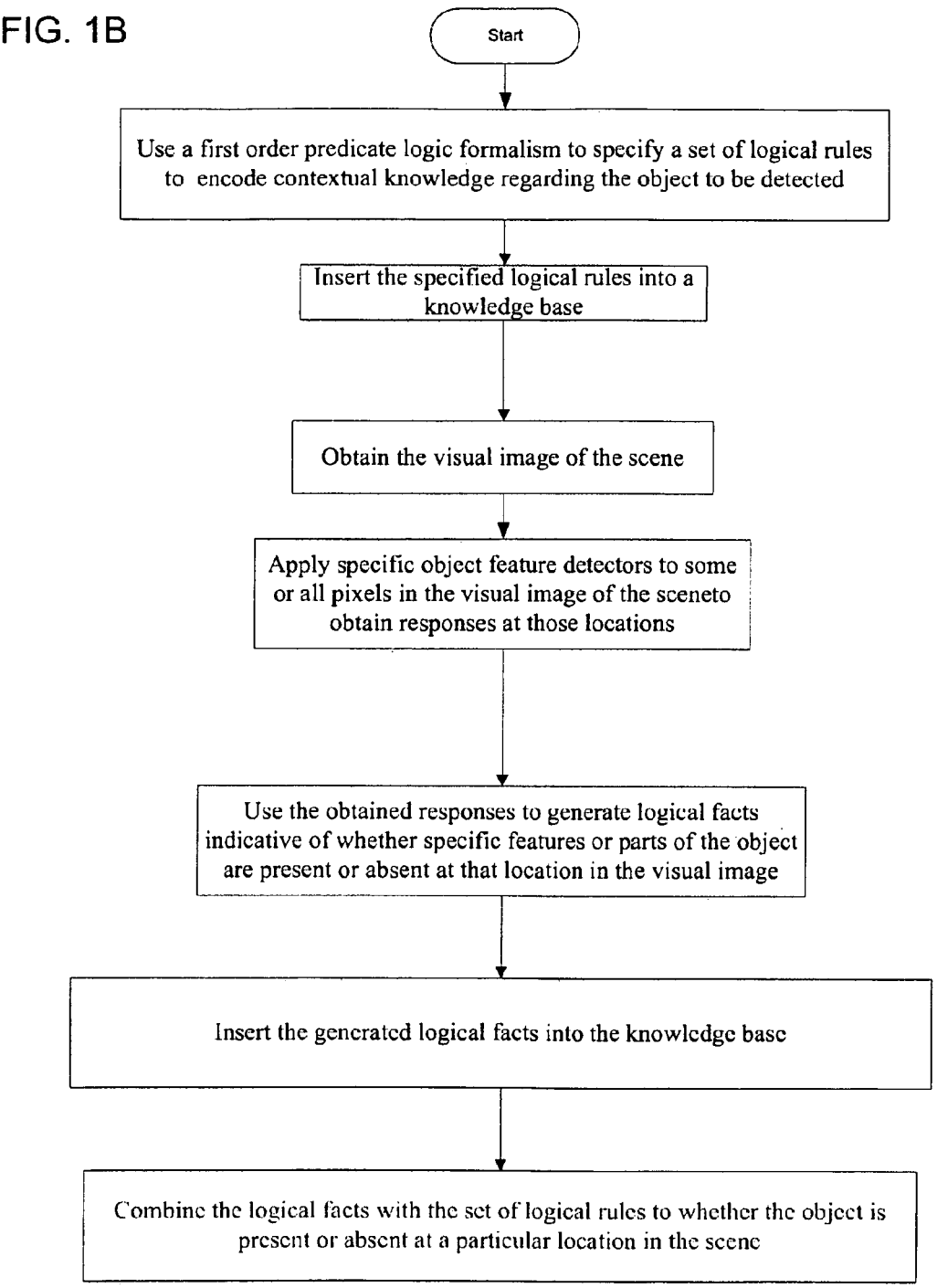
FIG. 1B is a more detailed overall flowchart of the method according to the invention.

Referring to FIG. 1B, a more general flowchart is shown. Thus, the method includes: using a first order predicate logic formalism to specify a set of logical rules to encode contextual knowledge regarding the object to be detected; inserting the specified logical rules into a knowledge base; obtaining the visual image of the scene; applying specific object feature detectors to some or all pixels in the visual image of the scene to obtain responses at those locations; using the obtained responses to generate logical facts indicative of whether specific features or parts of the object are present or absent at that location in the visual image; inserting the generated logical facts into the knowledge base; and combining the logical facts with the set of logical rules to whether the object is present or absent at a particular location in the scene.

In one embodiment, the contextual knowledge is encoded by the logical rules encompasses the responses of the feature detectors, geometric constraints pertinent to the visual image of the scene, interactions between the object and the scene, and interactions between multiple objects.

In one embodiment, the step of specifying logical rules includes specifying positive rules supporting the presence of the object at the particular location in the scene.

In one embodiment, the step of specifying logical rules includes specifying negative rules supporting the absence of the object at the particular location in the scene.

In one embodiment, the step of specifying logical rules includes specifying positive rules supporting the presence of the object at the particular location in the scene as well as specifying negative rules supporting the absence of the object at the particular location in the scene.

In one embodiment, the confidence values are associated with each of the logical rules.

In one embodiment, confidence values are associated with each of the logical facts, such confidence factors being a function of the responses returned by the object feature detectors.

In one embodiment, the confidence values are interpreted within a mathematical formalism.

In one embodiment, the formalism is a Bilattice.

In one embodiment, the confidence values form a tuple comprising positive evidence associated with the presence of the object in the scene and negative evidence associated with the absence of the object from the scene.

In one embodiment, the step of specifying logical rules includes specifying positive rules supporting the presence of the object at the particular location in the scene as well as specifying negative rules supporting the absence of the object at the particular location in the scene, and wherein positive logical rules and associated confidence values are used to derive positive evidence and negative logical rules and associated confidence values are used to derive negative evidence.

In one embodiment, performing the inference comprises computing closure over the knowledge base of logical rules and logical facts along with the associated confidence values.

In one embodiment, the greatest lower bound and least upper bound operators of the mathematical formalism are taken from a family of functions known as the triangular-norms and triangular-conorms respectively.

In one embodiment, the triangular-norm of two terms is defined as their product.

In one embodiment, the triangular-conorm of two terms is defined as their probabilistic sum.

In one embodiment, the confidence values associated with the logical rules are automatically learned from pre-annotated data.

In one embodiment, a proof is generated and displayed as an explanation of the reasons for the method to believe in the existence or nonexistence of the object at the particular location in the visual image of the scene.

In one embodiment, the proof generated is represented as plain English text.

In one embodiment, the proof generated is represented as statements in a logic program.

In one embodiment, the input is a single image of the scene.

In one embodiment, the input is a sequence of images of the scene.

In one embodiment, the object is a human.

2. Motivation

Referring again to FIG. 1, a scene is shown wherein a number of humans are occluded by the image boundary as well as by each other. Here, the method reasons that it is likely that individual 1 is human because two independent sources, the head detector and the torso detector report that it is a human. The absence of detection of human legs indicates it is possibly not a human, however this absence can be justified due to their occlusion by the image boundary. Furthermore, hypothesis 1 is consistent with the scene geometry and lies on the ground plane. Since the evidence for it being human (here, the, presence of head and torso) exceeds evidence against (here the absence of legs), the method should decide that it is indeed a human. Similar reasoning applies to individual 4, only its legs are occluded by human 2. Evidence against A and B (inconsistent with scene geometry and not on the ground plane respectively) exceeds evidence in favor of them being human and therefore A and B should be rejected as being valid hypotheses.

As will be described in more detail below, the process uses a bilattice based logical reasoning approach that exploits contextual information and knowledge about interactions between humans, and augments it with the output of different low-level detectors for human detection. Detections from low-level human body parts-based detectors are treated as logical facts and used to reason explicitly about the presence or absence of humans in the scene. Positive and negative information from different sources, as well as uncertainties from detections and logical rules, are integrated within the bilattice framework. This approach also generates proofs or justifications for each hypothesis it proposes. These justifications (or lack thereof) are further employed by the system to explain and validate, or reject potential hypotheses. This allows the system to explicitly reason about complex interactions between humans and handle occlusions. These proofs are also available to the end user as an explanation of why the system thinks a particular hypothesis is actually a human. The method uses a boosted cascade of gradient histograms based detector to detect individual human body parts.

Before describing the process for human detection, the following concepts will be discussed:

Reasoning Framework

First order predicate logic programming systems employ two kinds of formulae, facts and rules, to perform logical inference. Rules are of the form "$A \leftarrow A_0, A_1, \ldots, A_m$" where each $A_i$ is called an atom and ',' represents logical conjunction. Each atom is of the form $p(t_1, t_2, \ldots, t_n)$, where $t_i$ is a term, and p is a predicate symbol of arity n. Terms could either be variables (denoted by upper case alphabets) or constant symbols (denoted by lower case alphabets). The left hand side of the rule is referred to as the head and the right hand side is the body. Rules are interpreted as "if body then head". Facts are logical rules of the form "$A \leftarrow$" (henceforth denoted by just "A") and correspond to the input to the inference process. Finally, '$\neg$' represents negation such that $A = \neg\neg A$. In visual surveillance, rules typically capture knowledge about the proposition to be reasoned about and facts are the output of the low-level computer vision algorithms onto which the rules are applied [see V. Shet, D. Harwood, and L. Davis. Vidmap: video monitoring of activity with prolog. In *IEEE AVSS*, pages 224-229, 2005 and V. Shet, D. Harwood, and L. Davis. Multivalued default logic for identity maintenance in visual surveillance. In *ECCV*, pages IV: 119-132, 2006].

1. First Order Predicate Logic Based Reasoning

To perform the kind of reasoning outlined above, rules are specified that allow the process to take visual input from the low level detectors and explicitly infer whether or not there exists a human at a particular location. For instance, if a head, torso and legs detector were used, then a possible rule, written in a first order predicate logic formalism, would be:

human(X,Y,S)←head($X_h,Y_h,S_h$),
torso($X_t,Y_t,S_t$),
legs($X_l,Y_l,S_l$),
geometry_constraint($X_h,Y_h,S_h,X_t,Y_t,S_t,X_l,Y_l,S_l$),
compute_center($X_h,Y_h,S_h,X_t,Y_t,S_t,X_l,Y_l,S_l,X,Y,S$).

This rule captures the information (i.e., input facts) that if the head, torso and legs detectors were to independently report a detection at some location (X, Y) and scale (S), by asserting facts head($X_h,Y_h,S_h$), torso($X_t,Y_t,S_t$), legs($X_l,Y_l,S_l$) respectively), and these coordinates respected certain geometric constraints, then one could conclude that there exists a human at that location (X, Y) and scale (S). A logic programming system searches the input facts head($X_h,Y_h,S_h$), torso ($X_t,Y_t,S_t$), legs($X_l,Y_l,S_l$) to find all combinations that satisfy the rule and report the presence of humans at those locations. Note that this rule will only detect humans that are visible in their entirety. Similar rules can be specified for situations when one or more of the detections are missing due to occlusions or other reasons. There are, however, some problems with a system built on such rule specifications:

1. Traditional logics treat such rules as binary and definite, meaning that every time the body of the rule is true, the head will have to be true. For a real world system, we need to be able to assign some uncertainty values to the rules that capture its reliability.

2. Traditional logics treat facts as binary. We would like to take as input, along with the detection, the uncertainty of the detection and integrate it into the reasoning framework 3. Traditional logic programming has no support for explicit negation in the head. There is no easy way of specifying a rule like:

¬human(X,Y,S)← ¬scene_consistent(X,Y,S).

and integrating it with positive evidence. Such a rule says a hypothesis is not human if it is inconsistent with scene geometry.

4. Such a system will not be scalable. We would have to specify one rule for every situation we foresee. If we would like to include in our reasoning the output from another detector, say a hair detector to detect the presence of hair and consequently a head, we would have to re-engineer all our rules to account for new situations. We would like a framework that allows us to directly include new information without much re-engineering.

5. Finally, traditional logic programming does not have support for integration of evidence from multiple sources.

Bilattice Theory

Bilattices are algebraic structures introduced by Ginsberg [see M. L. Ginsberg. Multivalued logics: A uniform approach to inference in artificial intelligence. *Computational Intelligence*, 4(3):256-316, 1988] as a uniform framework within which a number of diverse applications in artificial intelligence can be modelled. In Ginsberg a bilattice formalism was used to model first order logic, assumption based truth maintenance systems, and formal systems such as default logics and circumscription. In O. Arieli, C. Cornelis, G. Deschrijver, and E. Kerre. Bilattice-based squares and triangles. *Lecture Notes in Computer Science: Symbolic and Quantitative Approaches to Reasoning with Uncertainty*, pages 563-575, 2005, it was pointed out that bilattices serve as a foundation of many areas such as logic programming, computational linguistics, distributed knowledge processing, reasoning with imprecise information and fuzzy set theory. In the present process, the automatic human detection system is looked upon as a passive rational agent capable of reasoning under uncertainty. Uncertainties assigned to the rules that guide reasoning, as well as detection uncertainties reported by the low level detectors, are taken from a set structured as a bilattice. These uncertainty measures are ordered along two axes, one along the source's (i.e., a single rule applied to a set of facts is referred to as a source here. There can be multiple rules deriving the same proposition (both positive and negative forms of it) and therefore we have multiple sources of information) degree of information and the other along the agent's degree of belief. As we will see, this structure allows the process to address all of the issues raised above and provides a uniform framework which not only permits us to encode multiple rules for the same proposition, but also allows inference in the presence of contradictory information from different sources.

Definition 1. Lattice A lattice is a set L equipped with a partial ordering $\leq$ over its elements, a greatest lower bound (glb) and a lowest upper bound (lub) and is denoted as L=(L,$\leq$) where glb and lub are operations from L×L→L that are idempotent, commutative and associative. Such a lattice is said to be complete, iff for every nonempty subset M of L, there exists a unique lub and glb.

Definition 2. Bilattice A bilattice is a triple B=(B,$\leq_t$,$\leq_k$) where B is a nonempty set containing at least two elements and (B,$\leq_t$), (B,$\leq_k$) are complete lattices. Informally a bilattice is a set, B, of uncertainty measures composed of two complete lattices (B,$\leq_t$) and (B,$\leq_k$) each of which is associated with a partial order $\leq_t$ and $\leq_k$ respectively. The $\leq_t$ partial order (agent's degree of belief) indicates how true or false a particular value is, with f being the minimal and t being the maximal while the $\leq_k$ partial order indicates how much is known about a particular proposition. The minimal element here is $\perp$ (completely unknown) while the maximal element is $\square$ (representing a contradictory state of knowledge where a proposition is both true and false). The glb and the lub operators on the $\leq_t$ partial order are $\wedge$ and $\vee$ and correspond to the usual logical notions of conjunction and disjunction, respectively. The glb and the lub operators on the $\leq_k$ partial order are $\otimes$ and $\oplus$, respectively, where $\oplus$ corresponds to the combination of evidence from different sources or lines of reasoning while $\otimes$ corresponds to the consensus operator. A bilattice is also equipped with a negation operator $\neg$ that inverts the sense of the $\leq_t$ partial order while leaving the $\leq_k$ partial order intact and a conflation operator—which inverts the sense of the $\leq_k$ partial order while leaving the $\leq_t$ partial order intact.

The intuition is that every piece of knowledge, be it a rule or an observation from the real world, provides different degrees of information. An agent that has to reason about the state of the world based on this input, will have to translate the source's degree of is information, to its own degree of belief. Ideally, the more information a source provides, the more strongly an agent is likely to believe it (i.e., closer to the extremities of the true axis (t-axis)). The only exception to this rule being the case of contradictory information. When two sources contradict each other, it will cause the agent's degree of belief to decrease despite the increase in information content. It is this decoupling of the sources and the ability of the agent to reason independently along the truth axis that helps us address the issues raised in above. It is important to note that the line joining $\perp$ and $\square$ represents the line of indifference. If the final uncertainty value associated with a hypothesis lies along this line, it means that the degree of belief for and degree of belief against it cancel each other out and the agent cannot say whether the hypothesis is true or false. Ideally the final uncertainty values should be either f or t, but noise in observation as well as less than completely reliable rules ensure that this is almost never the case. The horizontal line joining true, t and false, f is the line of consistency. For any point along this line, the degree of belief for will be exactly equal to (1-degree of belief against) and thus the final answer will be exactly consistent.

Definition 3. *Rectangular Bilattice* [see M. C. Fitting. Bilattices in logic programming. In 20*th International Symposium on Multiple-Valued Logic, Charlotte*, pages 238-247. IEEE CS Press, Los Alamitos, 1990 and O. Arieli, C. Cornelis, and G. Deschrijver. Preference modeling by rectangular bilattices. *Proc. 3rd International Conference on Modeling Decisions for Artificial Intelligence (MDAI'06)*, (3885):22-33, April 2006] Let L=(L,$\leq_L$) and R=(R,$\leq_R$) be two complete lattices. A rectangular bilattice is a structure L∘R=(L×R,$\leq_t$,$\leq_k$), where for every $x_1,x_2 \in L$ and $y_1,y_2 \in R$, $$\langle x_1, y_1 \rangle \leq_t \langle x_2, y_2 \rangle \Leftrightarrow x_1 \leq_L x_2 \text{ and } y_1 \geq_R y_2,$$

$$\langle x_1, y_1 \rangle \leq_k \langle x_2, y_2 \rangle \Leftrightarrow x_1 \leq_L x_2 \text{ and } y_1 \leq_R y_2$$

An element $\langle x_1, y_1 \rangle$ of the rectangular bilattice L∘R may be interpreted such that $x_1$ represents the amount of belief for some assertion while $y_1$ represents the amount of belief against it. If we denote the glb and lub operations of complete lattices L=(L,$\leq_L$), and R=(R,$\leq_R$) by $\wedge_L$ and $\vee_L$, and $\wedge_R$ and $\vee_R$ respectively, we can define the glb and lub operations along each axis of the bilattice L∘R as follows:

$$\langle x_1, y_1 \rangle \wedge \langle x_2, y_2 \rangle = \langle x_1 \wedge_L x_2, y_1 \vee_R y_2 \rangle, \quad (1)$$

$$\langle x_1, y_1 \rangle \vee \langle x_2, y_2 \rangle = \langle x_1 \vee_L x_2, y_1 \wedge_R y_2 \rangle,$$

$$\langle x_1, y_1 \rangle \otimes \langle x_2, y_2 \rangle = \langle x_1 \wedge_L x_2, y_1 \wedge_R y_2 \rangle,$$

$$\langle x_1, y_1 \rangle \oplus \langle x_2, y_2 \rangle = \langle x_1 \vee_L x_2, y_1 \vee_R y_2 \rangle$$

Of interest to us in our application is a particular class of rectangular bilattices where L and R coincide. These structures are called squares [see O. Arieli, C. Cornelis, G. Deschrijver, and E. Kerre. Bilattice-based squares and triangles. *Lecture Notes in Computer Science: Symbolic and Quantitative Approaches to Reasoning with Uncertainty*, pages 563-575, 2005] and L∘L is abbreviated as $L^2$. Since detection likelihoods reported by the low level detectors are typically normalized to lie in the [0,1] interval, the underlying lattice that we are interested in is L=([0,1],$\leq$). The bilattice that is formed by $L^2$ is depicted in FIG. 2. Each element in this bilattice is a tuple with the first element encoding evidence for a proposition and the second encoding evidence against. In this bilattice, the element f (false) is denoted by the element $\langle 0,1 \rangle$ indicating, no evidence for but full evidence against, similarly element t is denoted by $\langle 1,0 \rangle$, element $\perp$ by $\langle 0,0 \rangle$ indicating no information at all and $\square$ is denoted by $\langle 1,1 \rangle$. To fully define glb and lub operators along both the axes of the bilattice as listed in equations 1, we need to define the glb and lub operators for the underlying lattice ([0,1],$\leq$). A popular choice for such operators are triangular-norms and triangular-conorms. Triangular norms and conorms were introduced by Schweizer and Sklar [see B. Schweizer and A. Sklar. Associative functions and abstract semigroups. *Publ. Math. Debrecen*, 1963] to model the distances in probabilistic metric spaces. Triangular norms are used to model the glb operator and the triangular conorm to model the lub operator within each lattice.

Definition 4. triangular norm A mapping $$T:[0,1]\times[0,1]\rightarrow[0,1]$$

is a triangular norm (t-norm) iff T satisfies the following properties:

Symmetry: T(a,b)=T(b,a),$\forall a,b \in [0,1]$
Associativity: T(a,T(b,c))=T(T(a,b),c),$\forall a,b,c \in [0,1]$.
Monotonicity: T(a,b)$\leq$T(a',b') if a$\leq$a' and b$\leq$b'
One identity: T(a,1)=a,$\forall a \in [0,1]$.
Definition 5. triangular conorm A mapping $$S:[0,1]\times[0,1]\rightarrow[0,1]$$

is a triangular conorm (t-conorm) iff S satisfies the following properties:
Symmetry: $S(a,b)=S(b,a), \forall a,b \in [0,1]$
Associativity: $S(a,S(b,c))=S(S(a,b),c), \forall a,b,c \in [0,1]$.
Monotonicity: $S(a,b) \leq S(a',b')$ if $a \leq a'$ and $b \leq b'$
Zero identity: $S(a,0)=a, \forall a \in [0,1]$.

if T is a t-norm, then the equality $S(a, b)=1-T(1-a,1-b)$ defines a t-conorm and we say S is derived from T. There are number of possible t-norms and t-conorms one can choose. In our application, for the underlying lattice, $L=([0,1], \leq)$, we choose the t-norm such that $T(a,b) \equiv a \wedge_L b = ab$ and consequently choose the t-conorm as $S(a,b) \equiv a \vee_L b = a+b-ab$. Based on this, the glb and lub operators for each axis of the bilattice B can then be defined as per equation 1.

3. Inference

Inference in bilattice based reasoning frameworks is performed by computing the closure over the truth assignment.

Definition 6. Truth Assignment Given a declarative language L, a truth assignment is a function $\phi: L \to B$ where B is a bilattice on truth values or uncertainty measures.

Definition 7. Closure Let K be the knowledge base and $\phi$ be a truth assignment labelling each every formula $k \in K$. The closure over $\phi$, denoted $cl(\phi)$, is the truth assignment that labels information that is entailed by K.

For example, if $\phi$ labels sentences $\{p,(q \leftarrow p)\} \in K$ as $\langle 1,0 \rangle$ (true); i.e. $\phi(p)=\langle 1,0 \rangle$ and $\phi(q \leftarrow p)=\langle 1,0 \rangle$, then $cl(\phi)$ should also label q as $\langle 1,0 \rangle$ as it is information entailed by K. Entailment is denoted by the symbol '$\models$', $(K \models q)$.

Denote by S a set of sentences entailing q. The uncertainty measure to be assigned to the conjunction of elements of S should be $$\bigwedge_{p \in S} cl(\phi)(p) \quad (2)$$

This term represents the conjunction of the closure of the elements of S (Recall that $\wedge$ and $\vee$ are glb and lub operators along the $\leq_t$ ordering and $\otimes$ and $\oplus$ along $\leq_k$ axis. $\wedge$, $\vee$, $\otimes$, $\oplus$ are their infinitary counterparts such that $\oplus_{p \in S} p = p_1 \oplus p_2 \oplus \ldots$ and so on). It is important to note that this term is not the final uncertainty value to be assigned to q, rather it is merely a contribution to its final value. The reason it is merely a contribution is because there could be other sets of sentences S' that entail q, representing different lines of reasoning (or, in our case, different rules). These contributions need to be combined using the $\oplus$ operator along the information ($\leq_k$) axis. Also, if the expression in 2 evaluates to false, then its contribution to the value of q should be $\langle 0,0 \rangle$ (unknown) and not $\langle 0,1 \rangle$ (false). These arguments suggest that the closure over $\phi$ of q is $$cl(\phi)(q) = \bigoplus_{S \models q} \bot \vee \left[ \bigwedge_{p \in S} cl(\phi)(p) \right] \quad (3)$$

where $\bot$ is $\langle 0,0 \rangle$. We also need to take into account the set of sentences entailing $\neg q$. Aggregating this information yields the following expression:

$$cl(\phi)(q) = \bigoplus_{S \models q} \bot \vee \left[ \bigwedge_{p \in S} cl(\phi)(p) \right] \oplus \neg \bigoplus_{S \models \neg q} \bot \vee \left[ \bigwedge_{p \in S} cl(\phi)(p) \right] \quad (4)$$

For more details see M. L. Ginsberg. Multivalued logics: A uniform approach to inference in artificial intelligence. *Computational Intelligence*, 4(3):256-316, 1988. FIG. 3 shows an example illustrating the process of computing the closure as defined above by combining evidence from three sources. In this example, the final uncertainty value computed is $\langle 0.4944, 0.72 \rangle$. This indicates that evidence against the hypothesis at (25,95) at scale 0.9 exceeds evidence in favor of and, depending on the final threshold for detection, this hypothesis is likely to be rejected.

4. Negation

Systems such as this typically employ different kinds of negation. One kind of negation that has already been mentioned earlier is $\neg$. This negation flips the bilattice along the $\leq_t$ axis while leaving the ordering along the $\leq_k$ axis unchanged. Another important kind of negation is negation by failure to prove, denoted by not. not(A) succeeds if A fails. This operator flips the bilattice along both the $\leq_t$ axis as well as the $\leq_k$ axis. Recall above, $-$ was defined as the conflation operator that flips the bilattice along the $\leq_k$ axis. Therefore, $\phi(not(A)) = \neg - \phi(A)$. In other words, if A evaluates to $\langle 0,0 \rangle$ then not(A) will evaluate to $\langle 1,1 \rangle$. This operator is important when we want to detect the absence of a particular human body part for a hypothesis.

Detection System

Rules can now be defined within this bilattice framework to handle complex situations, such as humans being partially occluded by static structures in the scene or by other humans. Each time one of the detectors detects a human body part, it asserts a logical fact of the form $\phi(head(x, y, s)) = \langle \alpha, \beta \rangle$, where $\alpha$ is the measurement score the detector returns at that location and scale in the image and, for simple detectors, $\beta$ is $1-\alpha$. Rules are specified similarly as $\phi(human(X,Y,S) \leftarrow \ldots) = \langle \gamma, \delta \rangle$. $\gamma$ and $\delta$ are learnt as outlined above. We start by initializing a number of initial hypotheses based on the low level detections. For example, if the head detector detects a head and asserts fact $\phi(head(75,225,1.25)) = \langle 0.95, 0.05 \rangle$) Note that the coordinates here are not the centers of the human body parts, but rather the centers of the body), the system records that there exists a possible hypothesis at location (75,225) at scale 1.25 and submits the query human(75,225,1.25) to the logic program where support for and against it is gathered and finally combined into a single answer within the bilattice framework. Projecting the final uncertainty value onto the $\langle 0,1 \rangle - \langle 1,0 \rangle$ axis, gives us the final degree of belief in the hypothesis. We will now provide English descriptions of some of the rules employed in our system.

1. Rule Specification

Rules in such systems can be learnt automatically; however, such approaches are typically computationally very expensive. We manually encode the rules while automatically learning the uncertainties associated with them. The rules fall into three categories: Detector based, Geometry based and Explanation based Detector based: These are the simplest rules that hypothesize that a human is present at a particular location if one or more of the detectors detects a human body part there. In other words, if a head is detected at some location, we say there exists a human there. There are positive rules, one each for the head, torso, legs and full body based detectors as well as negative rules that fire in the absence of these detections.

Geometry based: Geometry based rules validate or reject human hypotheses based on geometric and scene information. This information is entered a priori in the system at setup time. We employ information about expected height of people and regions of expected foot location. The expected image height rule is based on ground plane information and anthropometry. Fixing a gaussian at an adult human's expected physical height allows us to generate scene consistency likelihoods for a particular hypothesis given its location and size. The expected foot location region is a region demarcated in the image outside of which no valid feet can occur and therefore serves to eliminate false positives.

Explanation based: Explanation based rules are the most important rules for a system that has to handle occlusions. The idea here is that if the system does not detect a particular human body part, then it must be able to explain its absence for the hypothesis to be considered valid. If it fails to explain a missing human body part, then it is construed as evidence against the hypothesis being a human. Absence of human body parts is detected using logic programming's 'negation as failure' operator (not). not(A) succeeds when A evaluates to ⟨0,0⟩ as described above. A valid explanation for missing human body part could either be due to occlusions by static objects or due to occlusions by other humans.

Explaining missed detections due to occlusions by static objects is straightforward. At setup, all static occlusions are marked. Image boundaries are also treated as occlusions and marked as shown in FIG. 1 (i.e., the black area at bottom of FIG. 1). For a given hypothesis, the fraction of overlap of the missing human body part with the static occlusion is computed and reported as the uncertainty of occlusion. The process is similar for occlusions by other human hypotheses, with the only difference being that, in addition to the degree of occlusion, we also take into account the degree of confidence of the hypothesis that is responsible for the occlusion, as illustrated in the rule below:

$$human(X,Y,S) \leftarrow not(torso(X_t,Y_t,S_t)),$$

$$torso\_body\_consistent(X,Y,S,X_t,Y_t,S_t)),$$

$$torso\_occluded(X,Y,S,X_o,Y_o,S_o),$$

$$Y_o > Y, human(X_o,Y_o,S_o). \quad (5)$$

This rule will check to see if human(X,Y,S)'s torso is occluded by human($X_o$, $Y_o$, $S_o$) under condition that $Y_o$>Y, meaning the occluded human is behind the 'occluder'. It might be noted that calling the human($X_o$,$Y_o$,$S_o$) within the definition of a 'human' rule will cause the system to infer the presence of human($X_o$,$Y_o$,$S_o$) from scratch. This rule has been presented in such a manner merely for ease of explication. In practice, we maintain a table of inferences that the query, human($X_o$, $Y_o$, $S_o$), can tap into for unification without re-deriving anything. Also we derive everything from the bottom of the image to the top, so human($X_o$,$Y_o$,$S_o$), if it exists, is guaranteed to unify. There is a similar rule for legs and also rules deriving ¬human in the absence of explanations for missing human body parts.

2. Learning

Given a rule of the form A←$B_1$,$B_2$, ..., $B_n$, a confidence value of ⟨F(A|$B_1$,$B_2$,...$B_n$), F(¬A|$B_1$,$B_2$,...$B_n$)⟩is computed, where F(A|$B_1$,$B_2$, ..., $B_n$) is the fraction of times A is true when $B_1$,$B_2$, ..., $B_n$ is true.

3. Generating Proofs

As mentioned earlier, in addition to using the explanatory ability of logical rules, we can also provide these explanations to the user as justification of why the system believes that a given hypothesis is a human. The system provides a straightforward technique to generate proofs from its inference tree. Since all of the bilattice based reasoning is encoded as meta-logical rules in a logic programming language, it is easy to add predicates that succeed when the rule fires and propagate character strings through the inference tree up to the root where they are aggregated and displayed. Such proofs can either be dumps of the logic program itself or be English text. In our implementation, we output the logic program as the proof tree.

5. Human Body Part Detector

Our human body part detectors are inspired by [see Q. Zhu, M. Yeh, K. Cheng, and S. Avidan. Fast human detection using a cascade of histograms of oriented gradients. In CVPR06, pages II: 1491-1498, 2006]. Similar to their approach we train a cascade of svm-classifiers on histograms of gradient orientations. Instead of the hard threshold function suggested in their paper, we apply a sigmoid function to the output of each svm. These softly thresholded functions are combined using a boosting algorithm [see Y. Freund and R. E. Schapire. A decision-theoretic generalization of on-line learning and an application to boosting. Journ. of Comp. and System Sciences, 55: 119-139, 19]. After each boosting round, we calibrate the probability of the partial classifier based on evaluation set, and set cascade decision thresholds based on the sequential likelihood ratio test similar to [see J. Sochman and J. Matas. Waldboost—learning for time constrained sequential detection. CVPR 2]. To train the human parts-based detector, we restrict the location of the windows used during the feature computation to the areas corresponding to the different human body parts (head/shoulder, torso, legs).

Figure 4:
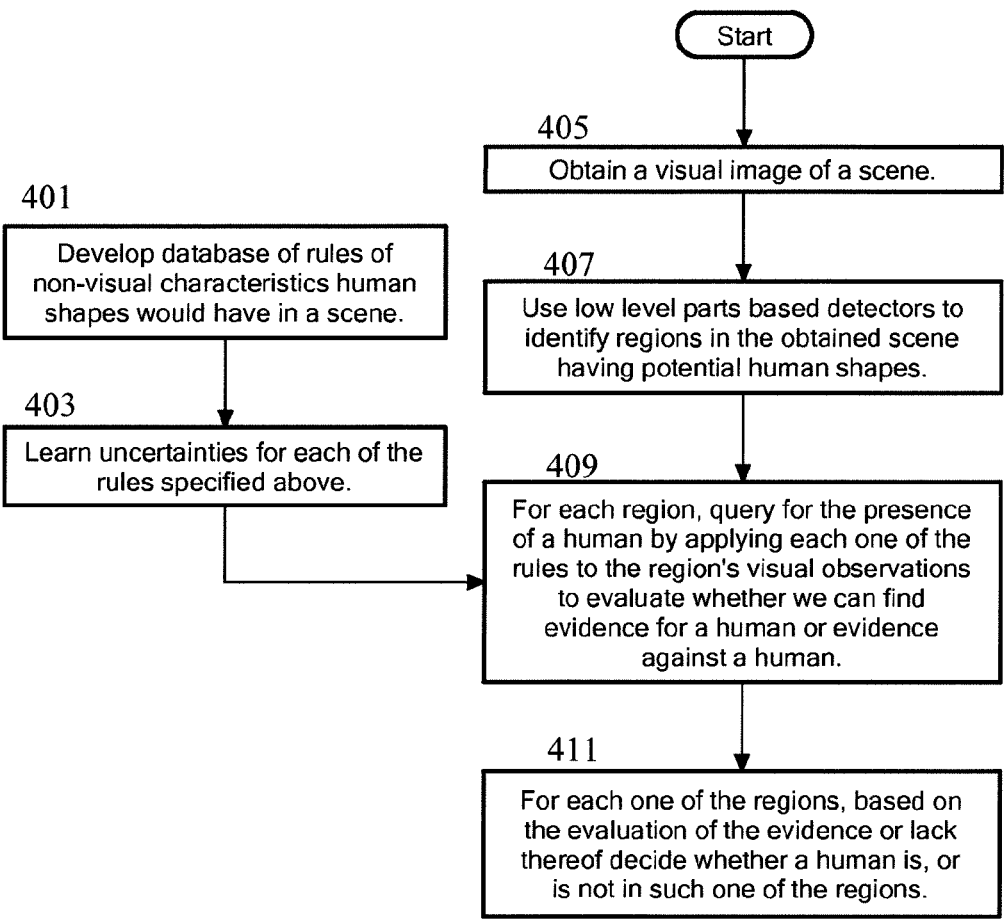
FIG. 4 is a more detailed flowchart of the method according to the invention.

Referring now to FIG. 4, a flowchart of the process is shown. First a knowledge base (i.e., a database) is developed of rules of non-visual characteristics human shapes would be in a scene in step 401. Next uncertainties (i.e., a confidence factor) is learned for each of the rules in the knowledge base in step 403.

Next, a visual image of a scene is obtained in step 405. Low-level human body parts based detectors are used to identify regions in the obtained scene having potential human shapes in step 407. For each region, query for the presence of a human by applying each one of the rules to the region's visual observations to evaluate whether there is evidence for a human or evidence against a human in the obtained potential human shapes in step 409. For each one of the regions, based on the evaluation of the evidence or lack thereof decides whether a human is, or is not in such one of the regions in step 411.

Figure 5:
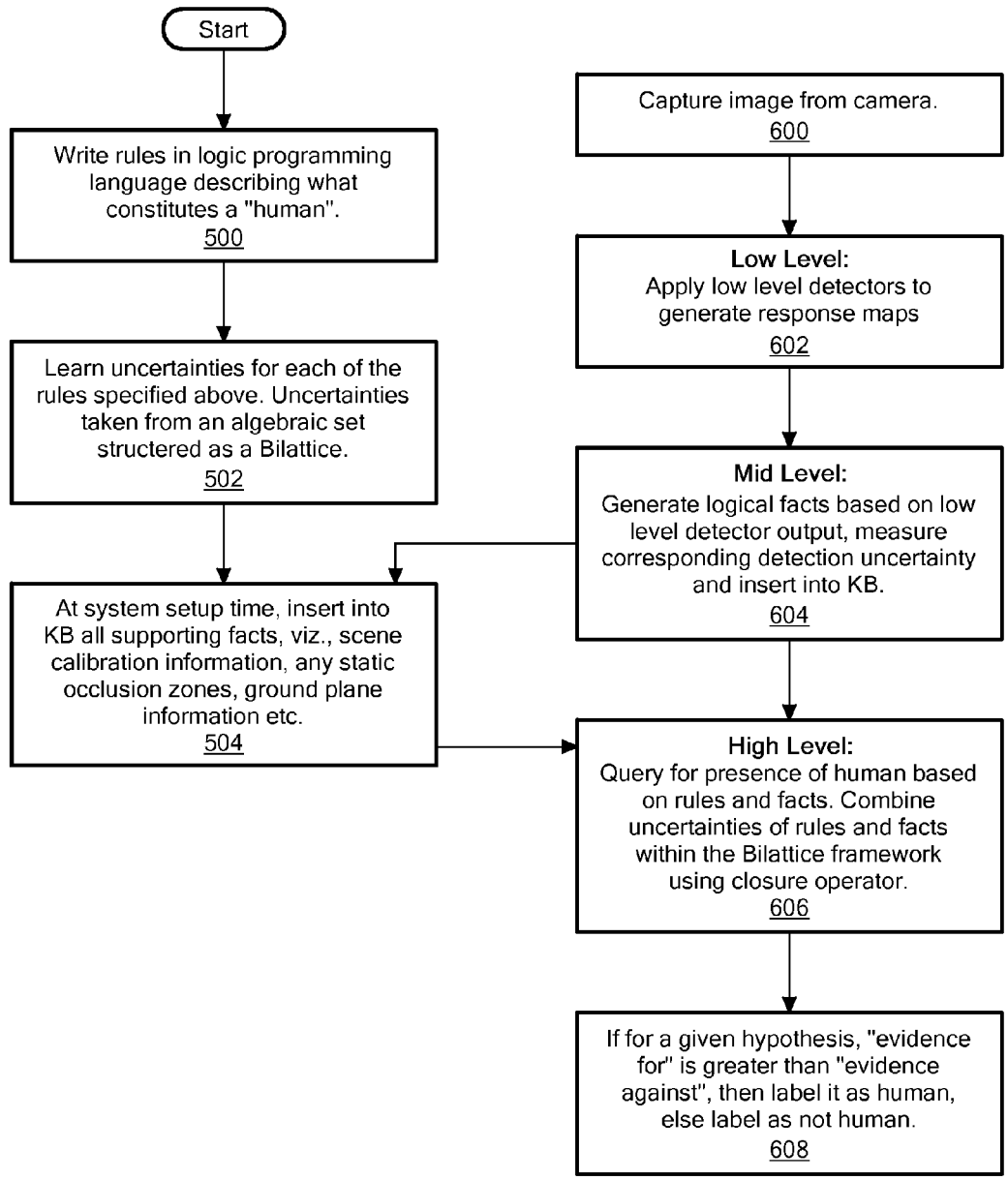
FIG. 5 is a still more detailed flowchart of the method according to the invention

A more detailed flowchart is shown in FIG. 5, a Knowledge Base (KB) is established as follows: First, a set of rules are written in logic programming language describing what constitutes a "human", Step 500. Next, uncertainties (i.e., a confidence factor) for each of the rules specified above are learned, and uncertainties taken from an algebraic set are structured as a Bilattice, Step 502. At system setup time, all supporting facts, viz., scene calibration information, any static occlusion zones, ground plane information etc, are inserted into a knowledge base (KB), Step 504.

Having established the KB and the bilattice, the process captures an image from a camera, Step 600. Next, low level human detectors are generated in, for example, response maps, Step 602. Next, the process generates logical facts based on the low level detectors, measures corresponding detection uncertainty and inserts the corresponding detection uncertainty into the KB, Step 604. Next, the process queries the KB for the presence of human based on rules and facts; combine uncertainties of rules and facts from the KB within the established Bilattice framework using closure operator, Step 606. Next, the process determines: If for a given hypothesis, "evidence for" is greater than "evidence against", then label it as human, else label as not human, Step 608.

Figure 6:
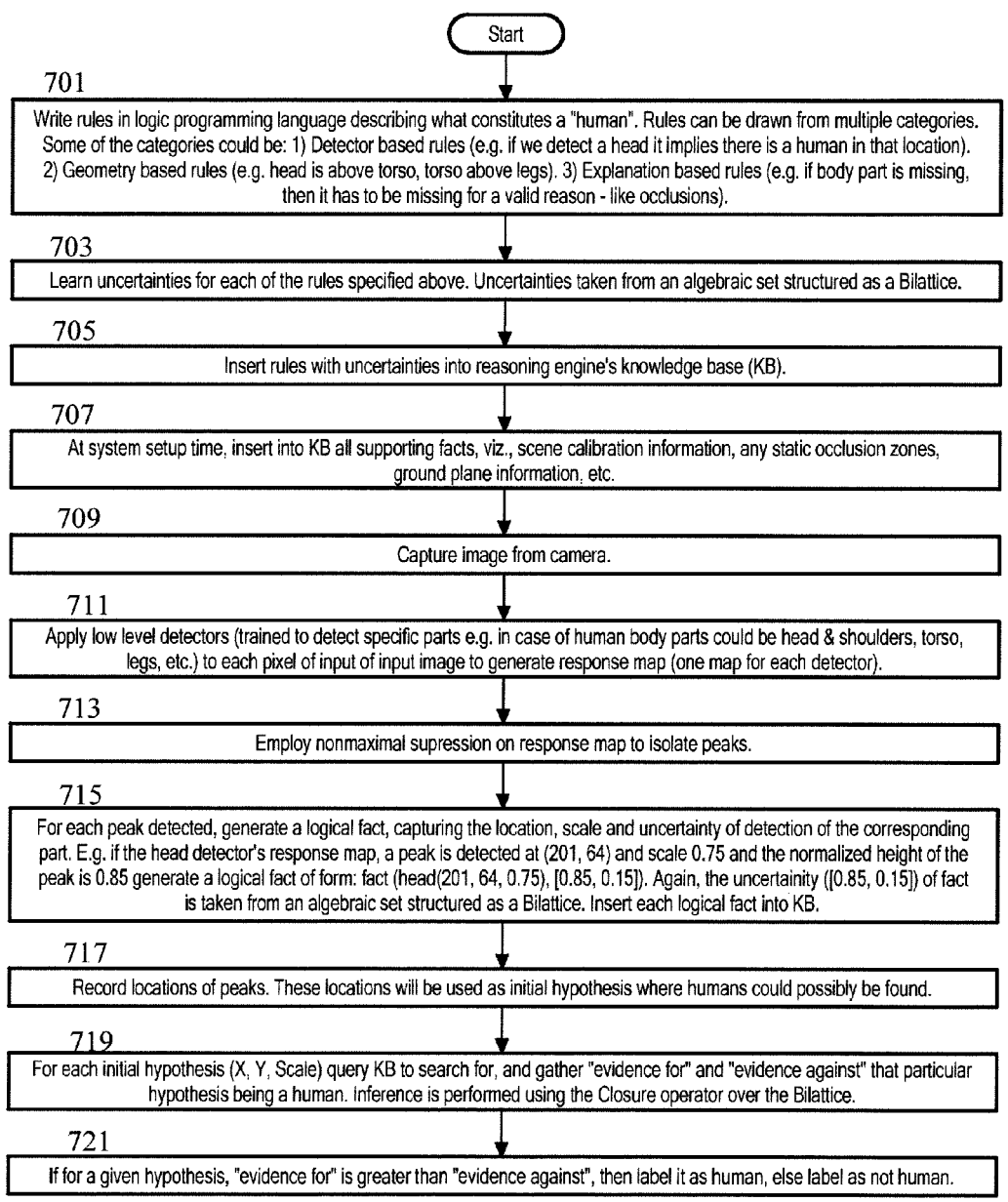
FIG. 6 is a still more detailed flowchart of the method according to the invention.

Referring now to FIG. 6, an even more detailed flowchart is shown.

I. The Knowledge Base is generated as follows:
(A) Write rules in logic programming language describing what constitutes a "human" in step 701.
  Rules can be drawn from multiple categories. Some of the categories could be:
  1) Detector based rules—(e.g. if we detect a head it implies there is a human in that location)
  2) Geometry based rules (e.g. head is above torso, torso above legs)
  3) Explanation based rules (e.g. if body part is missing, then it has to be missing for a valid reason—like occlusions),
(B) Learn uncertainties for each of the rules specified above in step 703. Uncertainties taken from an algebraic set structured as a Bilattice.
(C) Insert rules with uncertainties into reasoning engine's knowledge base (KB) in step 705.

II. Having established the KB, the method:
(A) At system setup time, inserts into KB all supporting facts, viz., scene calibration information, any static occlusion zones, ground plane information etc. in step 707
(B) Captures image from camera in step 709
(C) Applies low level human parts detectors (trained to detect specific parts e.g. in case of human body parts could be head & shoulders, torso, legs etc.) to each pixel of input image to generate response map (one map for each detector) in step 711
(D) Employs nonmaximal suppression on response map to isolate peaks in step 713.
(E) In step 715 for each peak detected, generates a logical fact, capturing the location, scale and uncertainty of detection of the corresponding part. For example, If the head detector's response map, a peak is detected at (201, 64) and scale 0.75 and the normalized height of the peak is 0.85 generate a logical fact of form: fact(head(201,64, 0.75), [0.85,0.151). Again, the uncertainty ([0.85, 0.15]) of fact is taken from an algebraic set structured as a Bilattice. Insert each logical fact into KB.
(F) Records locations of peaks in step 717. These locations will be used as initial hypotheses where humans could possibly be found
(G) In step 719 for each initial hypothesis (X,Y,Scale) queries KB to search for, and gather "evidence for" and "evidence against" that particular hypothesis being a human. Inference is performed using the Closure operator over the Bilattice. and
(H) If for a given hypothesis, "evidence for" is greater than "evidence against", then label it as human, else label as not human in step 721.

Implementation Details

The framework has been implemented in C++ with an embedded Prolog reasoning engine. The C++ module initializes the Prolog engine by inserting into its knowledge base all predefined rules. Information about scene geometry, and static occlusions is specified through the user interface, converted to logical facts and inserted into the knowledge base. The C++ module then runs the detectors on the given image, clusters the detector output, and finally structures the clustered output as logical facts for the Prolog knowledge base. Initial hypotheses are created based on these facts and then evidence for or against these hypotheses is searched for by querying for them.

A number of embodiments of the invention have been described. Nevertheless, it will be understood that various modifications may be made without departing from the spirit and scope of the invention. Accordingly, other embodiments are within the scope of the following claims.

What is claimed is:

1. A method for object detection from a visual image of a scene comprising:
  using a first order predicate logic formalism to specify a set of logical rules to encode contextual knowledge regarding the object to be detected and wherein a confidence value is associated with each of the logical rules;
  inserting the specified logical rules into a knowledge base;
  obtaining the visual image of the scene;
  applying specific object feature detectors to some or all pixels in the visual image of the scene to obtain responses at those locations;
  using the obtained responses to generate logical facts indicative of whether specific features or parts of the object are present or absent at that location in the visual image;
  inserting the generated logical facts into the knowledge base;
  combining the logical facts with the set of logical rules to detect whether the object is present or absent at a particular location in the scene; and
  wherein the confidence values form a tuple comprising positive evidence associated with the presence of the object in the scene and negative evidence associated with the absence of the object from the scene and the confidence values are interpreted within a mathematical formalism.

2. The method of claim 1, wherein contextual knowledge encoded by the logical rules encompasses the responses of the feature detectors, geometric constraints pertinent to the visual image of the scene, interactions between the object and the scene, and interactions between multiple objects.

3. The method of claim 1, wherein the step of specifying logical rules includes specifying positive rules supporting the presence of the object at the particular location in the scene.

4. The method of claim 1, wherein the step of specifying logical rules includes specifying negative rules supporting the absence of the object at the particular location in the scene.

5. The method of claim 1, wherein the step of specifying logical rules includes specifying positive rules supporting the presence of the object at the particular location in the scene as well as specifying negative rules supporting the absence of the object at the particular location in the scene.

6. The method of claim 1, wherein confidence values are associated with each of the logical facts, such confidence factors being a function of the responses returned by the object feature detectors.

7. The method recited in claim 1 wherein the formalism is a Bilattice.

8. The method of claim 7, wherein the step of specifying logical rules includes specifying positive rules supporting the presence of the object at the particular location in the scene as well as specifying negative rules supporting the absence of the object at the particular location in the scene, and wherein positive logical rules and associated confidence values are used to derive positive evidence and negative logical rules and associated confidence values are used to derive negative evidence.

9. The method of claim 8, wherein the greatest lower bound and least upper bound operators of the mathematical formalism are taken from a family of functions known as the triangular-norms and triangular-conorms respectively.

10. The method of claim 9, wherein the triangular-norm of two terms is defined as their product.

11. The method of claim 9, wherein the triangular-conorm of two terms is defined as their probabilistic sum.

12. The method of claim 1, wherein performing the inference comprises computing closure over the knowledge base of logical rules and logical facts along with the associated confidence values.

13. The method of claim 1, wherein confidence values associated with the logical rules are automatically learned from pre-annotated data.

14. The method of claim 1, wherein a proof is generated and displayed as an explanation of the reasons for the method to believe in the existence or nonexistence of the object at the particular location in the visual image of the scene.

15. The method of claim 14, wherein the proof generated is represented as plain English text.

16. The method of claim 14, wherein the proof generated is represented as statements in a logic program.

17. The method recited in claim 1 wherein the input is a single image of the scene.

18. The method recited in claim 1 wherein the input is a sequence of images of the scene.

19. The method recited in claim 1 wherein the object is a human.

* * * * *